(No Model.)

A. KNOCHE.
ELECTRICAL MOTOR.

No. 495,046. Patented Apr. 11, 1893.

WITNESSES:
A. Schehl.
Wm. Schulz.

INVENTOR
A. Knoche
BY Roeder & Briesen
ATTORNEYS.

UNITED STATES PATENT OFFICE.

AUGUST KNOCHE, OF ELBERFELD, GERMANY.

ELECTRICAL MOTOR.

SPECIFICATION forming part of Letters Patent No. 495,046, dated April 11, 1893.

Application filed July 22, 1892. Serial No. 440,887. (No model.) Patented in Germany March 14, 1891, No. 63,388.

*To all whom it may concern:*

Be it known that I, AUGUST KNOCHE, a subject of the Emperor of Germany, residing at Elberfeld, Germany, have invented certain new and useful Improvements in Electric Motors, (for which I have received Letters Patent in Germany, No. 63,388, dated March 14, 1891,) of which the following is a specification.

The object of my invention is to utilize, in an electric motor, the reactions which are set up when a permanent magnet and an electro magnet are moved relatively to each other.

Figure 1:
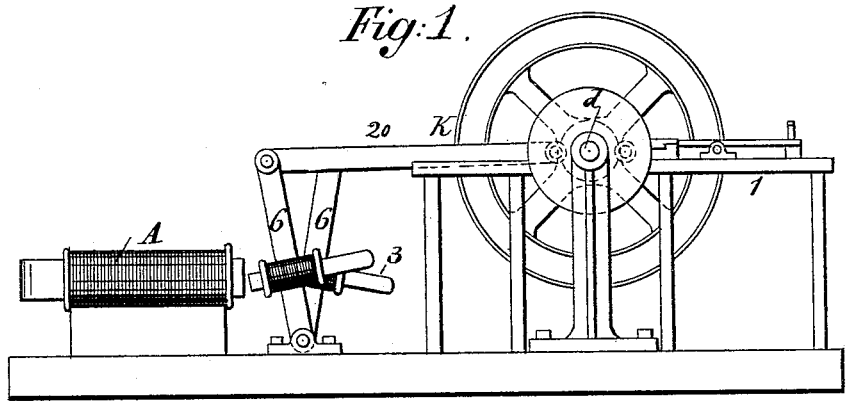
Figure 2:
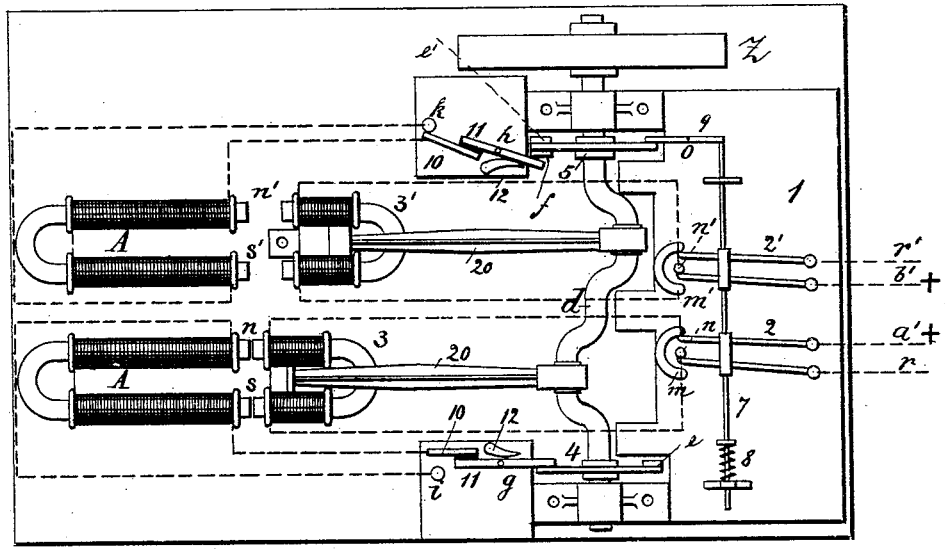

In the drawings, Figure 1, represents a vertical section of one form of my motor and Fig. 2, a horizontal section of the same.

The letters A, A, represent two permanent magnets, surrounded by coils of wire whose terminals are $k^{10}$, and $i^{10}$, respectively.

3, 3′, are two electro magnets whose coils are connected with the pole changers 2 and 2′, through the terminals $m, n$, and $m', n'$, respectively. The electromagnets 3, and 3′, are so arranged that they are movable in the line of the attractive and repulsive force. The motion of the said electromagnets is communicated to the axle $d$, by means of the levers 6 and rods 20, 20. Upon the axle $d$, are fastened two small wheels 4 and 5, which by means of their attachments serve to actuate the pole changers 2, and 2′, and also to open and close the coils of the permanent magnets A, A, at the proper moment. These two results are brought about through the motion of the machine itself and in the following manner: On one side of the wheel 5 is fastened a thin half ring $e'$, of any suitable material, and when the wheel 5, carried around with the axle $d$, in its revolution brings the half ring $e'$, under the lever 9, movable about the point $o$, the lever 9, depresses the rod 7, to which are attached the pole changers 2 and 2′, and the current is reversed in the electromagnets 3 and 3′.

To close the circuit of the permanent magnets A, A, I use a pair of levers $g$, and $h$, which are actuated by the half rings $e$, and $f$ attached to the wheels 4 and 5, respectively. These levers act as follows: During a portion of the revolution of the wheels 4 and 5, a spring 12 serves to keep the ends 10, 10, of the levers $g$, and $h$, out of contact with the posts $i$ and $k$. But when the revolution of the wheels 4 and 5, brings the half rings $e$, and $f$, under the end of the levers $g$, and $h$, the end pieces 10 (which must be of conductive material and insulated from the rest of the levers $g$, and $h$) which are one terminal of the permanent magnet coils, are brought into contact with the posts $i$, and $k$. Thus the coils of the permanent magnets are closed upon themselves.

$m, n$, and $m', n'$, are the terminals of the electromagnets, and through these electromagnet coils the current is sent in one direction and then another, by means of the working of the rod 7, to which are attached by a swivel pin, the pole changers 2 and 2′.

$r, a', r', b'$, are the conductors leading to any proper source of electricity.

Letters $n, s, n', s'$, represent the north and south poles of the lower and upper permanent magnets, respectively, and these poles, of course, remain constant.

The operation of the motor is as follows: The pole changers 2 and 2′, being connected to a suitable source of electricity, a current is sent through the electromagnets 3 and 3′, in such a direction, as to cause, say in 3′, the south and north poles of the electro magnet to be opposite the north and south poles respectively of the permanent magnet. An attraction will now be set up between the electromagnet and the permanent magnet. The two will tend to approach each other. But in accordance with Lenz's law a current will be set up in the permanent magnet which will tend to diminish the force of said magnet; therefore I so arrange the half ring $f$, on the wheel 5, that at the proper moment it shall act upon the lever $h$, and open the circuit of the permanent magnet coil and thus destroy the injurious effects of the induced current. At the moment when 3′, has reached its nearest approach to A, the half ring $e'$, acts upon the lever 9, through the rod 7, to change the position of the pole changers 2′ and 2, and a current is now sent into the coils of 3′, in such a direction that like poles are opposite each other in the electro and permanent magnet. A repulsive force is now exercised between the two magnets and they tend to separate. The current induced in the coils of the permanent magnet on the withdrawal of 3′, is of such a nature that it tends to increase the repulsive power of the magnet A, and I therefore so arrange the half ring $f$, on the wheel 5, that it shall, acting on the lever $h$, close the circuit of the permanent magnet coil. It is understood that the magnets 3 and A, act upon each other in the same manner, but while 3′, is being attracted, 3 is being repelled and vice versa.

What I claim is—

The combination of a fixed magnet and a movable magnet one of which is a permanent and the other an electro-magnet, with a coil upon the permanent magnet, a pole changer connected to the wires of the electro-magnet and a circuit closer for opening and closing the coil of the permanent magnet, substantially as specified.

AUGUST KNOCHE.

Witnesses:
WM. ESSENWEIN,
RUDOLPH FRICKE.